July 23, 1963 C. H. NEFFENGER 3,098,720
CORROSION TESTING MECHANISM
Filed June 7, 1961 2 Sheets-Sheet 1

INVENTOR.
CAREL H. NEFFENGER
BY
Watts, Edgerton, Pyle & Fisher
ATTORNEYS.

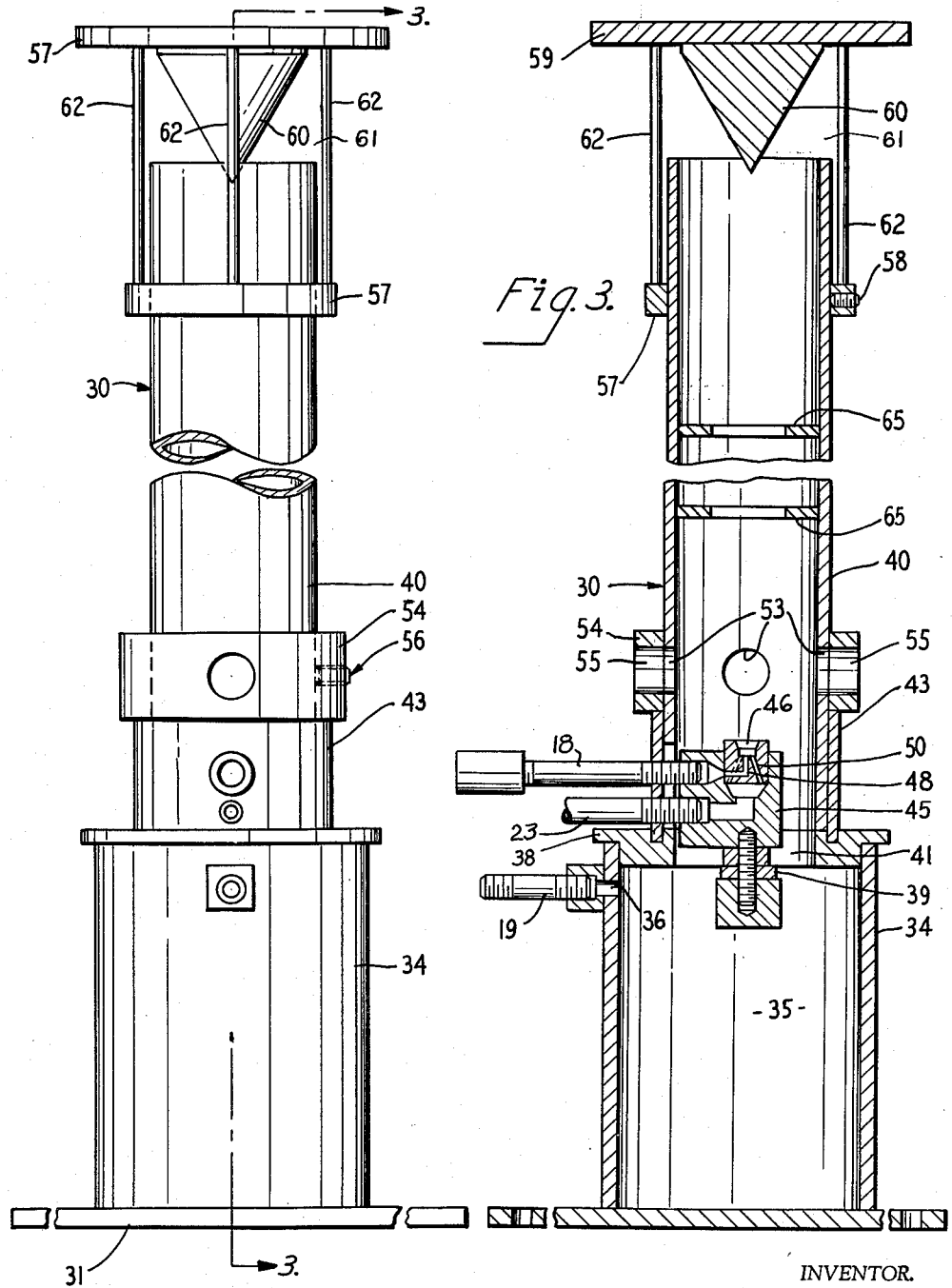

United States Patent Office 3,098,720
Patented July 23, 1963

3,098,720
CORROSION TESTING MECHANISM
Carel H. Neffenger, Elyria, Ohio, assignor to The G. S. Equipment Company, Cleveland, Ohio, a corporation of Ohio
Filed June 7, 1961, Ser. No. 115,467
13 Claims. (Cl. 23—253)

This invention pertains to test apparatus and more particularly to an accelerated corrosion test mechanism.

In present day manufacturing increasing amounts of attention are directed to the corrosion resistance of parts. Notably, the automobile industry, the military, and others constantly seek to improve the resistance of parts to corrosion induced by a variety of causes such as sea water and chemicals used on roads and highways to melt snow and ice. Similarly, products are exposed to other sources of corrosion such as air entrained chemical wastes and air entrained salt mist found in areas near seacoasts.

Two of the most important questions to be answered are: (1) What are the physical and/or chemical parameters of corrosion potential for a given product; and, (2) How will the product perform in service. These corrosion data are necessary with the use of any material. Prior to this invention, a mechanism for quickly obtaining such data accurately and consistently has been a major problem for all concerned with research, quality assurance, and standardized results.

To determine which of several parts has superior corrosion resistance, accelerated tests such as those known as salt spray (fog) testing are conducted. In conducting comparison tests to determine which of a plurality of objects offers the best corrosion resistance, standardization of test conditions is, of course, essential. More important, perhaps, such standardization is also essential in statistical quality control where periodic tests are conducted to measure the quality of manufactured parts. Prior to this invention, such comparison testing and statistical quality control has been materially hampered because it has not been possible to obtain uniform and dependable test results.

In conducting salt-spray fog and similar tests, a corrosion resistant test cabinet is used. A means is provided to create a fog-like dispersion of salt and/or other corrosion inducing material. With previously known test apparatus, there has been no dependable means for producing such a fog spray. The fog producing atomizers have varied appreciably from cabinet to cabinet and test to test in the same cabinet. Additionally, the performance of any one fog producing apparatus may vary appreciably with changes in surrounding conditions such as temperature and humidity. Fog produced by prior apparatuses has been poor, usually including entrained drops of the liquid used to produce the fog. These drops cause an uneven distribution of the corrosion fluid and therefore uneven results.

Previous cabinets have usually required a skilled technician who exercised a great deal of care and time in adjusting a given apparatus until it produced fog with acceptable dependability and consistency. Even when so adjusted, the previous test cabinets have had very great shortcomings because the fog was not uniformly distributed throughout the cabinet. A test piece located in one position within the cabinet would receive a different amount of exposure to the corrosion inducing material than would a test piece in another part of the cabinet.

In previous cabinets the fog was produced by an atomizing nozzle located near one corner of a cabinet chamber. The spray was directed against the side of the chamber or against a suitable adjustable baffle plate. The position of specimens within previous chambers have been found critical. There was a definite relationship to distance of the specimen from the spray nozzle, spray pressure, vent system layout, and baffle plate angle. It was often necessary to rotate the specimens within the chamber periodically during the test in order to attempt to counteract fog dispersion variables.

Under these described conditions, a number of problems have been inherent and apparent. Clearly statistical quality control and comparison testing has been greatly inhibited because of the lack of reliability in previously available equipment. Additionally, each such corrosion test cabinet has required the attention of a skilled and trained technician. It has been impractical to conduct identical tests in one city or at one laboratory and favorably compare the results with tests conducted at other installations.

As a practical example of the difficulties which have been encountered, the automobile manufacturing companies presently wish to have their suppliers conduct periodic tests on products which the suppliers are manufacturing. With test apparatus available prior to this invention, this has not normally been possible. It has not been possible because of the limitations described above. Comparison tests, even when conducted, have not been reliable because there is no appropriate standardization upon which to compare test results of the supplier with those of the manufacturer.

The present invention overcomes all of the listed and other disadvantages. They are overcome by the provision in a corrosion test cabinet of an apparatus which for the first time will produce uniform fog spray over the entire volume defined by the test cabinet. Not only will it produce a uniform distribution of spray but it will repeatedly produce uniform results so that more accurate and dependable comparison testing can be conducted.

With the present invention, a tower is positioned within the test cabinet, the tower emits a fine fog mist laterally from a location near the top of the cabinet. This mist is directed across the top of the cabinet and allowed to settle over the entire test area. In addition, chamber air is drawn into and entrained in this fog near a low location in the cabinet so that circulation of the fog is encouraged. Further, the tower is so designed and constructed that solid drops of corrosion fluids are precipitated out of the fog and returned to a trap rather than emitted into the test region. Thus, the only exposure which the products to be tested receive is a finely divided and controlled mist which is purged of drops of test fluid and which is uniformly distributed throughout the cabinet.

In the preferred arrangement this tower includes a pedestal. This pedestal defines a trap for collecting condensed and precipitated drops of the corrosion test fluid. A conduit directs the collected water from a trap to a storage reservoir. A conduit system brings the test fluid from the storage reservoir to an atomizing nozzle supported on the pedestal. The nozzle is positioned within a precipitation tube which is also supported on the pedestal. The precipitation tube provides an upwardly directed outlet passage for the fog emitted by the atomizing nozzle. The precipitation tube includes a plurality of air entrainment apertures near the nozzle. An adjustment sleeve surrounds the tube and is rotatable to vary the amount of entrained air. Adjustment of these apertures provides appropriate amounts of air entrainment for a given adjustable and controlled amount of emitted test fluid.

Near the top of the precipitation tube, a deflector such as a diversion cone is provided. This cone is maintained in an inverted position, point downward at the top, and in axial alignment with the tube. This cone is mounted on legs fastened to a ring. The ring is adjustably carried by the tube to allow vertical adjustment of the cone and with it control of the fog dispersion velocity.

As is suggested by the preceding discussion then, the principal object of this invention is to provide a novel and improved corrosion test mechanism which will provide uniformity of test conditions.

A more specific object of this invention is to provide a novel and improved corrosion fog emitting mechanism.

A still more special object of the invention is to provide a novel and improved corrosion fog emitting test mechanism which is in the form of a tower positioned in a test cabinet. The tower includes a means to adjust the quantity of air entrainment, an atomizing nozzle, and a precipitation, deflection, and an adjustable diverting arrangement positioned near the top of the cabinet to emit fog at a location at the top of the cabinet.

Still another object of this invention is to provide such a fog producing tower in which a means is included to cause precipitation of any and all large droplets of liquid and solids, if any, which are entrained in the fog.

Other objects and a fuller understanding of the invention may be had by referring to the following description and claims taken in conjunction with the accompanying drawings, in which:

FIGURE 2 is a foreshortened elevational view of the improved corrosion fog producing tower on an enlarged scale with respect to FIGURE 1; and FIGURE 3 is a sectional view of the tower as seen from the plane indicated by the line 3—3 of FIGURE 2.

Figure 1:
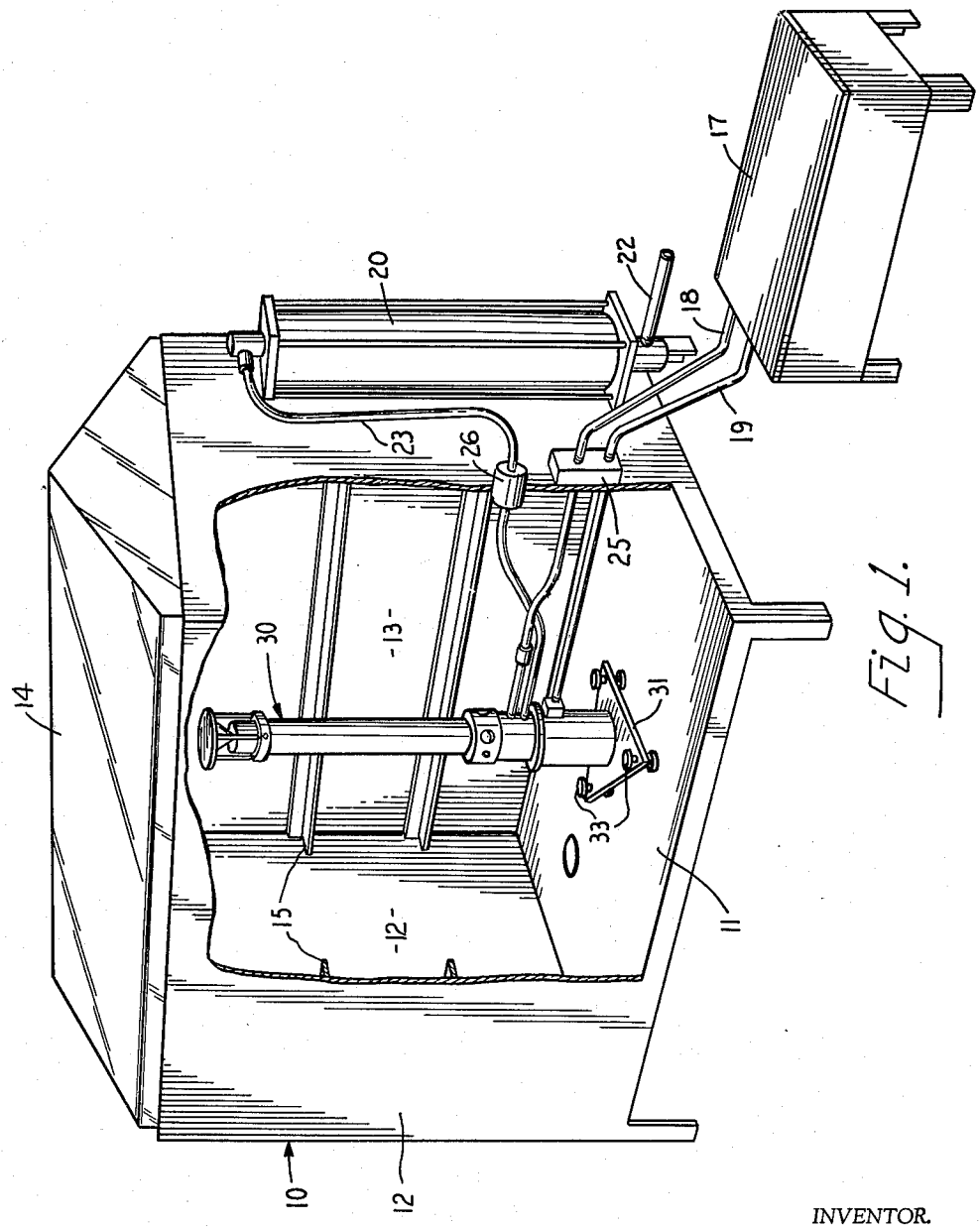
FIGURE 1 is a perspective view of the novel and improved test cabinet with parts broken away and removed for clarity of detail.

Referring now to the drawings, and to FIGURE 1 in particular, a test cabinet is shown generally at 10. The cabinet 10 has a corrosion resistant base 11 and corrosion resistant side walls 12 bounding a test space 13. A movable cover 14 which is resistant to corrosion is supported by the walls 12 to provide access to the normally closed space 13. When the device is in operation, test piece supporting racks (not shown) are normally positioned on selected pairs of a plurality of brackets 15. The brackets 15 are secured to the cabinet side walls 12.

A corrosion fluid supplying reservoir 17 is provided. The reservoir 17 may be positioned with equal facility either inside of the cabinet 10, or, as shown, external of it. In either event, supply and return conduits 18, 19 are connected to the reservoir 17. With the construction shown, the conduits 18, 19 pass through one of the side walls 12.

An air saturator 20 is secured to the one wall of the cabinet 10. A filtered air supply conduit 22 conducts air to the saturator. Air, after it is heated in the saturator, is carried by a heated air conduit 23 through the one of the walls 12. Seals 25, 26, surround the conduits 18, 19 and the conduit 23 respectively to form fluid tight seals between these conduits and the side wall through which they pass.

An aspirator assembly in the form of a fog inducing tower is positioned in the space 13 and shown generally at 30. The details of this fog inducing tower are shown best in FIGURES 2 and 3. The tower 30 is preferably formed of plastic to provide maximum corrosion resistance and it includes a pedestal shown generally at 31. The pedestal 31 comprises a base mounting plate 32. In the embodiment shown, the base mounting plate is a triangular plate carried by leveling legs 33. The leveling legs 33 rest on the base of the test cabinet. The pedestal also includes a trap tube 34 connected to the base 32 in a fluid-tight manner. This trap tube is preferably a circular tube defining a cylindrical trap 35. Fluids collected in the trap 35 are removed by the return conduit 19 which is connected to a trap outlet aperture 36 near the top of the trap tube 34.

A flanged annular trap cover 38 rests on the top of the trap tube 34, to complete the pedestal 31. The trap cover 38 serves as both a cover for the trap tube 34 and a support for that portion of the tower 30 which is above it. In its preferred form, the trap cover 38 includes a cross bar 39 which supports an aspirator nozzle 45. The cross bar 39 and trap cover 38 together define condensate passages 41 which conduct precipitated fluid from a precipitation tube 40 to the trap 35. The fog conduction and precipitation tube 40 is carried by the trap cover 38. The precipitation tube 40 is secured to the trap cover 38 by a surrounding and reinforcing sleeve 43.

The atomizing nozzle 45 is positioned within the precipitation tube 40 of the tower. The atomizing nozzle 45 includes an outlet orifice 46 positioned to emit an air fluid mixture vertically along the axis of the vertical precipitation tube 40. The test solution supply conduit 18 is connected to the nozzle 45. The test solution conduit 18 communicates with the outlet orifice 46 through a central passage 48. The air supply conduit 23 is also connected to the nozzle 45. The air supply conduit 23 communicates with the orifice 46 through a plurality of metering passages 50, only one of which is shown.

The precipitation tube 40 includes a plurality of air induction apertures 53. These apertures are circumferentially spaced and preferably located with their axes lying in a common horizontal plane. The apertures 53 are located near and shown slightly above the nozzle 45, though they may be slightly below it. An air entrainment adjustment sleeve 54 surrounds the precipitation tube 40 and rests on the support sleeve 43. The adjustment sleeve 54 includes a plurality of adjustment apertures 55 which are circumferentially spaced such that they can each be aligned with a complemental one of the air entrainment apertures 53 when the adjustment sleeve 54 is in a full open position, FIGURE 3. The adjustment sleeve 54 is rotatable to a full closed position, FIGURE 2. In the full closed position, the apertures 53, 55 are completely out of registry and the entrainment of air through the air entrainment apertures 53 is prevented. As will be apparent, the adjustment sleeve 54 is infinitely adjustable between the full open and the full closed positions. A set screw 56 is provided to lock sleeve 54 in its adjusted position.

When the tower is positioned for use, a precipitation tube 40 is vertical. A deflection support ring 57 surrounds the tube 40 near the top. The ring is axially movable and secured in a selected and adjusted position by a setscrew 58. A disc-like cover 59 is positioned above the tube 40 and in axial alignment with it. The cover 59 is of greater diameter than the tube extending laterally outwardly in all directions. The cover 59 carries an inverted deflection cone 60 which has its axis projectable into the interior of the tube 40. The cover and cone are supported by a plurality of legs 62 which extend upwardly from the supporting ring 57. The cover and cone together form a deflection baffle. This baffle, together with the tube 40, defines an annular fog outlet opening 61. The sides of the opening are adjusted by vertically moving the baffle so as to control the velocity of the corrosion fog emitted by the tower.

One of the outstanding advantages of this invention resides in the ability to separate and precipitate out any drops of fluid from the fog, so that the corrosion inducing substance emitted by the tower 30 is a very finely dispersed mist or fog. A number of factors contribute to this advantage. First of all, the thorough-going and full entrainment of air through the adjustable apertures 53, assures adequate air in which to disperse the atomized fluid emitted by the nozzle 45. Second, since the precipitation tube 40 extends from the trap cover 38 upwardly for a substantial length, to the top of the cabinet, drops of water carried by the emitted and rising fog tend to precipitate or rain out passing through the apertures 41 and collecting in the trap 35. Any drops of water which have not been precipitated out of the fog will be directed against the deflection and precipitation cone 60 collecting there. The water collected on the cone 60 will, of course, drop off and ultimately drop into the trap 35. In applications where a relatively short tower is used, the full purging and separation of water from the fog can be enhanced by the addition of baffles 65 such as those shown in FIGURE 3.

This uniform fog dispersion is further enhanced by the outward diversion by the adjustable cone such that the fog spreads uniformly radially in all directions from the tower across the top of the corrosion tank. Since the cone 60 is adjustable, a selected choking or throttling effect can be obtained by adjusting the size of the orifice 61. Control of the velocity inherently controls the range of the emitted fog and therefore the area of fog dispersion.

While velocity and therefore the range of fog dispersion is controlled by adjusting the baffle assembly which includes the cover and cone 59, 60, the amount of fog emitted is controlled by the adjustment sleeve 54. If the sleeve is positioned in its full closed position such that air entrainment apertures 53 are completely shut off, a substantial vacuum will be created in the tower. This of course, inhibits the emission of fog from the tower. When, on the other hand, the sleeve 54 is in its full open position, there is substantially no vacuum in the tower. Thus, there is substantially no resistance to the emission of fog from the tower. The amount of fog emitted is, then controlled by the amount of vacuum allowed to form within the tower.

While the invention has been described with a great deal of detail, it is believed it essentially comprises an aspirator tower for a test cabinet. The tower has a means to inhibit the emission of drops of fluid. The tower emits a finely-dispersed fog laterally near its top and draws in liquid entrainment air near the bottom. The tower is also preferably adjustable to control both the amount and the range of fog emission.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A corrosion testing mechanism comprising an enclosure resistant to attack by a corrosive test fluid, said enclosure defining a test-conducting space for retaining an atmosphere of corrosion testing mist therein and including a specimen access opening and a movable closure therefor, an axially upwardly extending tube in said enclosure having an upper outlet opening, a mist-producing aspirator nozzle positioned within said tube and orientated toward said outlet, said nozzle being spaced from said outlet and from the walls of said tube to permit relatively large liquid drops in the mist to gravitate downwardly past said nozzle as the mist rises in said tube toward said outlet, trap means below said nozzle and adjacent the bottom end of said tube for collecting said liquid drops, and supply conduit means connected to said nozzle for supplying a test liquid and a gas under pressure.

2. In a corrosion testing mechanism including a cabinet for retaining an atmosphere of corrosion testing mist therein, said cabinet having a specimen access opening and a movable closure therefor, and a fog tower positioned within said cabinet for producing a corrosive mist, said fog tower comprising a vertical tube having an upper outlet end, a mist-producing aspirator nozzle disposed within said tube and directed toward said outlet end, said nozzle being spaced from said outlet end and from the walls of said tube to permit relatively large liquid drops in the mist to gravitate downwardly and past said nozzle as the mist rises in said tower toward said outlet end, a trap below said nozzle and adjacent the bottom end of said vertical tube for collecting said liquid drops, and conduit means connected to said nozzle for supplying a test liquid and gas under pressure.

3. The testing mechanism as claimed in claim 2 wherein said fog tower includes a baffle for aiding in the precipitation of relatively large liquid drops from said mist.

4. The corrosion testing mechanism as claimed in claim 2 wherein said fog tower further includes an air inlet near the base of said tube for permitting air to be drawn into said tube as the mist rises toward said outlet opening.

5. The testing mechanism as claimed in claim 2 including baffle means adjustably connected to said tower for movement toward and away from said outlet opening.

6. The testing mechanism as claimed in claim 5 wherein said baffle means includes an inverted cone axially aligned with said tube.

7. A corrosion testing mechanism comprising a cabinet formed of a material resistant to attack by a corrosive test mist, said cabinet defining a test space for retaining an atmosphere of corrosion testing mist therein and including means forming a closable specimen access opening into said space, support means, said support means defining a liquid-receiving chamber, a vertical tube in said cabinet supported by said support means, said vertical tube having an upper outlet opening into the top portion of said cabinet and a bottom end in liquid communication with said chamber, a mist-producing aspirator nozzle disposed within said tube and directed toward said outlet opening, said nozzle being spaced from said outlet opening and from the walls of said tube to permit relatively large liquid drops in the mist to gravitate downwardly past said nozzle into said chamber as the mist rises in said tube toward said outlet opening, and conduit means connected to said nozzle for supplying a corrosive liquid and gas under pressure.

8. The corrosion testing mechanism as claimed in claim 7 including an inverted conical baffle spaced above said outlet opening of said tube and axially aligned therewith, means adjustably connecting said baffle to said tube for permitting said baffle to be moved toward and away from said outlet opening, said tube also including a plurality of air entrainment apertures near said nozzle, and a control ring rotatably mounted on said tube, said ring including a plurality of holes adapted to be aligned with said air entrainment apertures.

9. In a corrosion testing mechanism including a fog tower device for forming and uniformly distributing a corrosion-producing fog spray mist, said device comprising an open-ended tube, a fog mist-producing aspirator nozzle positioned within said tube, said nozzle including an outlet orifice positioned to emit an atomized corrosive fluid along the axis of said tube toward one end thereof, a test solution conduit communicating with said orifice and a gas supply conduit communicating with said orifice, said nozzle being spaced from said one end and from the walls of said tube so that, when said tube is disposed vertically with said one end uppermost, relatively large drops in the mist are permitted to precipitate and fall past said nozzle as the mist rises in said tube toward said one end whereby a finely divided and controlled fog mist is emitted therefrom, and conduit means for supplying a test liquid and gas under pressure to said conduits in said nozzle.

10. The device as claimed in claim 9 wherein said tube includes an air hole near the end of said tube opposite said one end, whereby air is drawn into said tube as the mist rises toward said one end.

11. The device as claimed in claim 10 wherein said device includes means for controlling the effective size of said air hole, whereby the air pressure in said tube can be varied.

12. The device as claimed in claim 10 including baffle means connected to said tube and disposed in the path of mist flow through said fog tower device, whereby the mist is caused to impinge against said baffle means.

13. The device as claimed in claim 12 wherein said baffle means comprises an inverted cone above said one end of said tube and axially aligned therewith, and means adjustably connecting said cone to said tube, whereby said cone is movable toward and away from said one end.

References Cited in the file of this patent
UNITED STATES PATENTS

| | | |
|---|---|---|
| Re. 24,771 | Seibel | Jan. 14, 1960 |
| 434,013 | Barker | Aug. 12, 1890 |
| 548,941 | Wilder | Oct. 29, 1895 |
| 686,707 | Bowman | Nov. 19, 1901 |
| 1,029,528 | Bosch et al. | June 11, 1912 |
| 1,387,170 | Poindexter | Aug. 9, 1921 |
| 2,630,183 | Foutz | Mar. 3, 1953 |
| 2,655,435 | Ludgett | Oct. 13, 1953 |
| 2,702,741 | Robertson | Feb. 22, 1955 |
| 2,736,289 | Allen | Feb. 28, 1956 |
| 2,897,060 | Dieman | July 28, 1959 |
| 3,062,273 | Colin-Smith | Nov. 6, 1962 |

OTHER REFERENCES

Rohm and Haas Reporter, pages 1–4, May–June 1955.
Champion "Corrosion Testing Procedures," Chapman and Hall, pages 88–90, FIG. 17, London 1952.
Fisher "Modern Laboratory Appliance," pages 126–127.
The Rohm & Haas Reporter, New Standards in Test Cabinets, pages 22–24, May–June 1955.